United States Patent
Ethington, Jr. et al.

(10) Patent No.: US 6,726,941 B2
(45) Date of Patent: Apr. 27, 2004

(54) AMORPHOUS SOLID CAST FEED PRODUCT MADE BY SOLIDIFYING LIQUID AGRICULTURAL BYPRODUCTS

(75) Inventors: Reed T. Ethington, Jr., Marshall, MN (US); Randall M. Lessman, Tracy, MN (US)

(73) Assignee: Archer Daniels Midland Company, Decatur, IL (US)

(*) Notice: Subject to any disclaimer, the term of this patent is extended or adjusted under 35 U.S.C. 154(b) by 0 days.

(21) Appl. No.: 10/223,580

(22) Filed: Aug. 19, 2002

(65) Prior Publication Data

US 2003/0152689 A1 Aug. 14, 2003

Related U.S. Application Data

(60) Provisional application No. 60/313,614, filed on Aug. 20, 2001.

(51) Int. Cl.$^7$ .............................. A23K 1/02; A23K 1/06; A23K 1/08; A23K 1/12; A23K 1/14

(52) U.S. Cl. ........................ 426/2; 426/635; 426/658; 426/805; 426/807

(58) Field of Search ............................ 426/2, 635, 658, 426/805, 807

(56) References Cited

U.S. PATENT DOCUMENTS

| | | |
|---|---|---|
| 3,035,920 A | 5/1962 | Knodt |
| 3,961,081 A | 6/1976 | McKenzie |
| 4,005,192 A | 1/1977 | Graham et al. |
| 4,016,296 A | 4/1977 | DeSantis |
| 4,027,043 A * | 5/1977 | Schroeder et al. ............ 426/69 |
| 4,062,988 A | 12/1977 | De Santis |
| 4,160,041 A * | 7/1979 | Schroeder et al. ............ 426/69 |
| 4,171,379 A | 10/1979 | Harmon et al. |
| 4,171,385 A | 10/1979 | Skoch et al. |
| 4,171,386 A | 10/1979 | Skoch et al. |

(List continued on next page.)

FOREIGN PATENT DOCUMENTS

| | | |
|---|---|---|
| CA | 1 203 414 | 4/1986 |
| GB | 2 100 749 A | 1/1983 |

OTHER PUBLICATIONS

American Dairy Products Institute, "New ADPI reports detail quantities and uses of nonfat dry milk, whey," *Cheese Market News*, p. 15, Susan Quarne (1998).

"Corn Wet Milled Feed Products," 3$^{rd}$ edition, Corn Refiners Association, Inc., Washington, DC, pp. 1–24 (1989).

Curtin, L.V., "Molasses—General Considerations," in *Molasses in Animal Nutrition*, National Feed Ingredients Association, West Des Moines, IA, pp. 1–11 (1983).

"Mother Earth Alcohol Fuel: Chapter 1—Introduction," in *Mother's Alcohol Fuel Seminarte, Mother Earth News*, available at http://journeytoforever.org/biofuel_library/ethanol_motherearth/meCh1.html (1980).

"Mother Earth Alcohol Fuel: Chapter 2—Raw materials," in *Mother's Alcohol Fuel Seminar*, Mother Earth News, available at http://journeytoforever.org/biofuel_library/ethanol_motherearth/meCh2.html (1980).

"Mother Earth Alcohol Fuel: Chapter 3—Basic Steps," in *Mother's Alcohol Fuel Seminar*, Mother Earth News, available at http://journeytoforever.org/biofuel_library/ethanol_motherearth/meCh3.html (1980).

"Mother Earth Alcohol Fuel: Chapter 6—By–products," in *Mother's Alcohol Fuel Seminar*, Mother Earth News, available at http://journeytoforever.org/biofuel_library//ethanol_motherearth/meCh6.html (1980).

Nilson, K.M., and Welch, J.G., "Feeding Whey to Dairy Cows," *Marschall Italian & Specialty Cheese Seminars 1974–5*:1–3, Rhodia Dairy (1974).

Parmentier, K., "Determination of the Volume of Industrial Waste from Wisconsin's Dairy Products Industry," *WasteNOT–organics*, University of Wisconsin Extension, available at http://www.wastenot–organics.wisc.edu/library/whey.htm (May 2000).

Pate, F.M., "Molasses in Beef Nutrition," in *Molasses in Animal Nutrition*, National Feed Ingredients Association, West Des Moines, IA pp. 1–57 (1983).

Pate, F.M., and Kunkle, W.E., "Molasses–Based Feeds and Their Use as Supplements for Brood Cows," *University of Florida Electronic Data Information Source*, University of Florida Institute of Food and Agricultural Sciences, available at http://edis.ifas.ufl.edu/BODY_AN050.html (1989).

Roy, K.H., and Kattnig, R.M., "Value and Quality Assurance of Byproduct Feeds," *Beef Cattle Handbook 5056*:1–5, MidWest Plan Service (1999).

Schingoethe, D.J., "Feeding Whey and Molasses," in *National Dairy Database*, National Agricultural Database Laboratory, available at http://www.inform.umd.edu/EdRes/Topic/AgrEnv/ndd/feeding/FEEDING_WHEY_AND_MOLASSES.html (1991).

*Primary Examiner*—C. Sayala
(74) *Attorney, Agent, or Firm*—Sterne, Kessler, Goldstein & Fox P.L.L.C.

(57) ABSTRACT

An amorphous solid cast feed product is made by solidifying a substantially liquid agricultural byproduct. The byproduct may be selected from stillage, condensed fermented corn solubles, stillage, condensed distillers solubles, whey, condensed whey solubles, or any mixture thereof. The amorphous solid cast feed product may further include an exogenous source of a carbohydrate, a fat, a vitamin, a mineral, and/or nitrogen, as well as a sulfonated lignin material, a recycled animal waste product, and/or another miscellaneous fibrous material. The substantially liquid agricultural byproduct may first be condensed by heat, then solidified by being cooled in a mold. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims. 37 C.F.R. §1.72(b).

41 Claims, No Drawings

U.S. PATENT DOCUMENTS

| | | |
|---|---|---|
| 4,181,652 A | 1/1980 | Detroit |
| 4,212,896 A | 7/1980 | Brown, Jr. et al. |
| 4,221,818 A | 9/1980 | Schroeder |
| 4,265,916 A | 5/1981 | Skoch et al. |
| RE31,763 E | 12/1984 | Skoch et al. |
| RE31,804 E | 1/1985 | Skoch et al. |
| 4,547,386 A | 10/1985 | Chambers et al. |
| 4,584,200 A | 4/1986 | Burelsmith |
| 4,617,861 A * | 10/1986 | Armstrong .................... 99/453 |
| 4,631,192 A | 12/1986 | Mommer et al. |
| 4,650,679 A | 3/1987 | Parker et al. |
| 4,708,877 A | 11/1987 | Donovan et al. |
| 4,729,896 A | 3/1988 | Sawhill |
| 4,731,249 A | 3/1988 | Findley |
| 4,735,809 A | 4/1988 | Donovan et al. |
| 4,749,578 A | 6/1988 | Benton et al. |
| 4,798,727 A | 1/1989 | Miller |
| 4,800,088 A | 1/1989 | Sawhill |
| 4,851,244 A | 7/1989 | Theuninck et al. |
| 4,904,486 A | 2/1990 | Donovan et al. |
| 4,957,769 A | 9/1990 | Theuninck et al. |
| 4,960,589 A | 10/1990 | Sasagawa |
| 4,963,371 A | 10/1990 | Miller |
| 4,976,977 A | 12/1990 | Johnson et al. |
| 4,988,520 A | 1/1991 | Overton |
| 4,994,282 A * | 2/1991 | Miller ........................ 426/74 |
| 4,994,284 A | 2/1991 | Miller |
| 5,068,114 A * | 11/1991 | Chanen et al. ................ 426/69 |
| 5,073,388 A | 12/1991 | Miller |
| 5,075,402 A | 12/1991 | Schmitt et al. |
| 5,185,174 A * | 2/1993 | Sawhill ....................... 426/583 |
| 5,195,458 A | 3/1993 | Black et al. |
| 5,236,717 A | 8/1993 | Vinci |
| 5,260,089 A | 11/1993 | Thornberg |
| 5,264,227 A | 11/1993 | Laroche et al. |
| 5,281,434 A | 1/1994 | Winowiski et al. |
| 5,288,857 A | 2/1994 | Aarsrud et al. |
| 5,480,641 A | 1/1996 | Casas-Perez |
| D375,181 S | 11/1996 | Tourney et al. |
| 5,622,739 A | 4/1997 | Benton et al. |
| 5,643,622 A | 7/1997 | Sawhill |
| 5,656,309 A | 8/1997 | Sawhill |
| 5,709,894 A * | 1/1998 | Julien ......................... 426/53 |
| 5,755,177 A | 5/1998 | Michehl |
| 5,925,737 A | 7/1999 | Tomasula et al. |
| 6,077,358 A | 6/2000 | Giersch et al. |
| D428,232 S | 7/2000 | Thornberg |
| 6,113,974 A | 9/2000 | Winowiski et al. |
| 6,126,986 A | 10/2000 | Harris et al. |
| 6,139,900 A | 10/2000 | Foegeding et al. |
| 6,143,333 A | 11/2000 | Lanter et al. |
| 6,244,217 B1 | 6/2001 | Robbins |
| 6,270,823 B1 | 8/2001 | Jolkin |
| 6,277,426 B1 | 8/2001 | Reust |

* cited by examiner

AMORPHOUS SOLID CAST FEED PRODUCT MADE BY SOLIDIFYING LIQUID AGRICULTURAL BYPRODUCTS

CROSS-REFERENCES TO RELATED APPLICATIONS

This application claims priority under 35 U.S.C. §119 (e) to, and hereby incorporates by reference, U.S. Provisional Application No. 60/313,614, filed Aug. 20, 2001.

BACKGROUND

1. Field of the Invention

This invention relates to livestock feed products and, in particular, this invention relates to livestock feed products made with byproducts from refining agricultural raw materials.

2. Background

Large amounts of liquid byproducts are generated when agricultural commodities are used to manufacture finished products such as starch, fermentation products, cheese, wood products, and fruit juices. Representative liquid byproducts of this nature are steepwater, stillage, whey, sulfonated lignin materials (lignin sulfonate), hemicellulose extract (liquor), citrus molasses, corn (starch) molasses, soap stocks (vegetable oil refinery lipids), lecithin, condensed extracted glutamic acid fermentation product, and condensed fermentation solubles. Liquid byproducts from refining agricultural products have traditionally been costly to dispose of because they contain high proportions of water and relatively high levels of organic materials. These organic materials are rich in nutrients such as carbohydrates, amino acids, vitamins and unknown materials favorable for livestock growth and development. However, the high water content of these liquid byproducts imparts significant disadvantages such as increased weight and perishability and their liquidity requires expensive specialized equipment for transportation, storage, and incorporation into livestock feed.

There is then a need for an easily and efficiently handled feed product, which advantageously and economically uses perishable and substantially liquid agricultural byproducts. There is a particular need for a feed product, which has the nutritive qualities found in these substantially liquid byproducts, yet is easily and economically transported, stored, and dispensed to livestock.

SUMMARY OF THE INVENTION

A method of making an amorphous solid cast feed product is provided. The method may include condensing a substantially liquid agricultural byproduct; and solidifying the condensed substantially liquid agricultural byproduct to form the amorphous solid cast feed product. The amorphous solid cast feed product may have a solids content between about 71 and 97 weight percent.

An amorphous solid cast feed product is also provided. The amorphous solid cast feed product may include a condensed substantially liquid agricultural byproduct, a 10 weight percent aqueous solution (10% of the present product dissolved in 90% water by weight) of the amorphous solid cast feed product having a pH less than about 7.5.

An amorphous solid cast feed product formed from a process is further provided. The process may include condensing a substantially liquid agricultural byproduct and solidifying the condensed substantially liquid agricultural byproduct. A 10 weight percent aqueous solution of the amorphous solid cast feed product may have a pH less than about 7.5.

Additional objects, advantages, and features of various embodiments of the invention will be set forth in part in the description which follows, and in part will become apparent to those skilled in the art upon examination of the following or may be learned by practice of the invention.

DETAILED DESCRIPTION

An overview of the processes giving rise to steepwater, stillage, and whey is initially provided. Subsequently, the properties and manufacturing protocols for making the products of this invention are described in greater detail. With respect to steepwater and stillage, these manufacturing processes are described with particularity to corn (*Zea mays* L.). However, it is recognized that the methods and products made therefrom are applicable to byproducts from processes which use a wide range of agricultural products, representatives of which are specified and characterized herein. All publications, patents, patent publications, and other documents cited herein are hereby incorporated by reference in their entirety. Definitions for materials and processes used in the present invention shall be those contained in the 2002 Official Publication of the Association of American Feed Control Officials, Inc., Oxford, Ind.; Corn and Corn Improvement, Third Edition, American Society of Agronomy, Madison, Wis. (1988); Corn: Chemistry and Technology, American Association of Cereal Chemists, Inc., St. Paul, Minn. (1987), and other incorporated documents. In case of conflict, the definitions contained in the 2002 Official Publication of the Association of American Feed Control Officials, Inc. shall prevail over definitions in other incorporated documents. In the case of conflict between the present specification and any incorporated document, the present specification shall prevail. All percentages and proportions disclosed herein are on a weight basis unless otherwise specified.

The corn wet milling process begins with an initial steep in a water-sulfur dioxide (e.g., 0.12–0.20%) solution. After being steeped, the corn kernels are milled and the kernel components are separated by screening, centrifuging, washing, and subsequent enzymatic conversion to produce starch, oil, feed byproducts, and sweeteners. During steeping, the corn kernels are soaked in water under carefully controlled conditions involving temperature, time, sulfur dioxide concentration, and lactic acid content. Steeping softens the kernels, thereby facilitating separation of the kernel components. In many cases, 1.2–1.4 cubic meters of water per ton of corn (8–9 gallons per bushel) is used for steeping. Usually, about 0.5 cubic meters of water per ton of corn (3.5 gallons per bushel) is absorbed by the corn kernels during the steeping process. The remaining 0.7–0.9 cubic meter of water per ton of corn (4.5–5.5 gallons per bushel) is withdrawn before the soaked corn kernels are processed. This withdrawn steepwater contains solubles soaked out of (solubilized from) the corn during steeping. On a dry matter basis, steepwater often contains 0.05–0.06 ton of solids per ton of corn processed (2.8–3.6 pounds per bushel of 56 pounds). Steepwater may be added to wort being fermented or may be evaporated to a solids content of about 50 percent. When steepwater has been evaporated to a solids content of about 50 percent, the resulting material is called steep liquor, heavy corn steepwater, or condensed fermented corn extractives.

The distillation and fermentation industries manufacture compounds such as ethanol, butyl alcohol, acetone, lactic acid, and distilled spirits (e.g., whiskey). Corn is a major raw material used in the production of these materials. For example, in the production of ethanol from corn, the corn kernels are cleaned, degermed, ground into meal, and then cooked into a mash. Alternatively, starch from wet milling may be used as a substrate. In either case, the starch is usually converted into sugar by the action of diastatic enzymes. Yeast (*Saccharomyces cerevisiae*) is then added to induce fermentation of the sugar into alcohol and carbon dioxide. After fermentation is complete, the spent grains are removed and the wort is distilled to recover the alcohol. The liquid remaining after the alcohol has been distilled therefrom is known as stillage. Water from the stillage is often evaporated to a solids content of about 50 percent to form distillers solubles. In some instances, steepwater is a component of the wort, the carbohydrates thereof being used as a substrate during fermentation. In other situations, steepwater is blended with stillage, then evaporated to a higher solids content. Hence, the term stillage is intended to include stillage derived from wort formed by blending steepwater with other materials and a blend of stillage and steepwater. The term condensed distillers solubles is intended to encompass materials resulting from evaporating stillage formed by any of the foregoing methods.

When cheese is being made, milk is curdled using a proteolytic enzyme called rennet. The role of rennet is to destabilize casein micelles in the milk, thereby coagulating the casein micelles. The rennet destabilizes the casein micelles by breaking down kappa-casein present on the micelle surfaces, which then form a gel. The gel has the remnants of the casein in a matrix of clusters and small chains. The clusters and small chains encapsulate fat globules. Void spaces in the gel matrix are filled with a liquid milk serum called whey. Whey is a solution of lactose, minerals, vitamins, and a suspension of whey proteins. The freshly coagulated milk is mechanically cut or broken into smaller particles as it is slowly heated and stirred. While being heated and stirred, the casein micelle clusters gradually shrink until the whey is expelled and the protein matrix becomes compacted, thereby forming a curd which is further processed into cheese. For every pound of cheese made, approximately nine pounds of liquid whey are produced as byproduct. Whey can be recovered and processed for a variety of uses. These uses include animal feed, human food products, and pharmaceuticals. See, "New ADPI Reports Detail Quantities and Uses of Nonfat Dried Milk, Whey," *Cheese Market News*, Aug. 28, 1998. However, the use of whey per se as an animal feed has met with limited acceptance. Drying whey to, e.g., a 10 percent moisture level, requires large expenditures of energy and is therefore relatively expensive. However, whey per se, or in a more condensed form, can be advantageously utilized in making the feed supplement of the present invention. One condensed form of whey, condensed whey solubles, is about 50 percent solids.

Cattle producers use condensed fermented corn extractives, distillers solubles, and condensed whey solubles to balance ration protein requirements to a limited extent. However, using these substantially liquid byproducts per se in rations has required expensive equipment to store these byproducts and to mix feed rations having these byproducts as ingredients. Additionally, these byproducts either freeze or become so viscous as to be impossible to blend into feed formulations under cold temperatures. Hence, using condensed fermented corn extractives, distillers solubles, and condensed whey solubles in rations has not been a widely used practice. Moreover, due to the relatively high water content of these byproducts, shipping has been expensive due to the weight imparted by their water content. Because of these and other factors, these substantially liquid byproducts have been a low income item for wet millers, dairy foods processors, and fermenters relative to the other products produced. Additionally, phosphorus-containing nutrients in condensed fermented corn extractives, distillers solubles, and condensed whey solubles represent pollutants with increased disposal expenses when these liquid byproducts are disposed of as waste, but pose great potential when used as feed ingredients on cattle being range fed, where these phosphorus-containing nutrients are limiting, hence desirable.

In one embodiment, a base formulation is made by concentrating a substantially liquid agricultural byproduct such as steepwater, condensed fermented corn extractives, stillage, distillers solubles, whey, condensed whey solubles, lignin sulfonate, hemicellulose extract, citrus molasses, lecithin, condensed extracted glutamic acid fermentation product, condensed fermentation solubles, or any mixture thereof, into an amorphous solid cast. The term "substantially liquid" is meant to define a substance which contains sufficient water to be flowable at an ambient temperature (e.g., 60–100 degrees Fahrenheit). An "amorphous solid cast" is defined as an essentially homogeneous dispersion having a three-dimensional shape at room temperature, but which may be flowable or deformable either over a period of time (e.g., at least 24 hours) or under mechanical pressure.

The present amorphous solid cast may have a dry solids content of between about 71–97 weight percent, between about 80–95 weight percent, between about 85–90 weight percent, or any range subsumed therein and a pH in a 10 weight percent aqueous solution of less than about 7.5, less than about 6.5, between about 3.5–7.5, between about 3.5–6.5, or any range subsumed therein. The substantially liquid agricultural byproduct is condensed by heat or by a combination of heat and reduced atmospheric pressure. The heating may take place at a lower temperature under a reduced atmospheric pressure. If heat is the sole agent, temperatures between about 100–240 degrees Fahrenheit, between about 150–220 degrees Fahrenheit, between about 175–215 degrees Fahrenheit, or any range subsumed therein may be used. If heating occurs under a reduced atmospheric pressure, partial vacuums of between about 15–25 inches Hg, between about 17–25 inches Hg, between about 20–25 inches Hg, or any range subsumed therein may be present at heating temperatures between about 140 and 200 degrees Fahrenheit, between about 150 and 190 degrees Fahrenheit, between about 160 and 180 degrees Fahrenheit, or any range subsumed therein. The lower temperatures enabled by reduced atmospheric pressures may minimize nutritive degradation, e.g. protein denaturation and Maillard reactions. Alternatively, the substantially liquid agricultural byproduct may be heated until it reaches a temperature between about 175–190 degrees Fahrenheit, between about 180–185 degrees Fahrenheit, or any range subsumed therein, at which point enough moisture has been evaporated to allow the final product to sufficiently harden. If heating to the foregoing temperatures is practiced under a partial vacuum (as recited above) the time and energy required for the materials to reach between about 175–190 degrees Fahrenheit, between about 180–185 degrees Fahrenheit, or any range subsumed therein can be reduced. Concentration may be practiced in a single step or in multiple steps. For example, an initial concentration may be conducted to between about a 50–90 weight percent dry solids content, between about a 55–85 weight percent dry solids content, between about a 60–80 weight percent dry solids content, or any range subsumed therein. A subsequent concentration may be conducted to achieve a product between about 71–97 weight percent dry solids, between about 80–95 weight percent dry solids, between about 85–90 weight percent dry solids, or any range subsumed therein.

When all the ingredients have been added and homogeneously dispersed, e.g., by being mixed, the resulting mixture may be poured, pumped, extruded, or otherwise conveyed into a mold such as a container. Once conveyed into a mold, the resulting mixture solidifies therein as cooling occurs to constitute the finished product.

In another embodiment, between about 35–99.9 weight percent, between about 40–80 weight percent, between about 45–75 weight percent, or any range subsumed therein, of the above-described substantially liquid agricultural byproduct is combined with between about 0.1–65 weight percent, between about 20–60 weight percent, between about 25–55 weight percent, or any range subsumed therein, of an exogenous carbohydrate, then concentrated into an amorphous solid cast, an aqueous solution of the amorphous solid cast having a pH within the ranges specified above. Concentration may be achieved by heat or a combination of heat and reduced atmospheric pressure in a single step or in multiple steps as described above.

In still another embodiment, between about 75–99.9 weight percent, between about 80–95 weight percent, between about 87–92 weight percent, or any range subsumed therein, of the above-described substantially liquid agricultural byproduct is combined with between about 0.1–25 weight percent, between about 5–20 weight percent, between about 8–13 weight percent, or any range subsumed therein, of an exogenous fat. This mixture may be concentrated by heat or a combination of heat and reduced pressure in one or more steps as described above.

In yet another embodiment, between about 35–99.9 weight percent, between about 40–90 weight percent, or between about 45–85 weight percent, or any range subsumed therein, of the above-described substantially liquid agricultural byproduct is combined with between about 0.1–50 weight percent, 5–45 weight percent, 10–40 weight percent, or any range subsumed therein, of an exogenous carbohydrate and between about 0.1–25 weight percent, between about 5–20 weight percent, between about 10–15 weight percent, or any range subsumed therein of an exogenous fat. This mixture may be concentrated by heat or a combination of heat and reduced pressure in one or more steps as described above.

Another product of the present invention with enhanced protein content is made combining corn steepwater, corn distillers solubles or condensed fermented corn extractives and one or more exogenous carbohydrates. A vegetable oil and/or corn syrup refinery insolubles may also be added. The enhanced protein may be provided by vegetable protein sources, such as distillers dried grains, corn gluten meal, and soy meal. Additionally, minerals such as limestone, dicalcium phosphate, and sources of zinc, iron, copper, cobalt, magnesium, potassium, manganese, selenium, iodine, molybdenum, and sodium may be added as well. Moreover, vitamin A, vitamin D, vitamin E, and vitamin B12 may be added. A product of the present invention with enhanced protein may contain between about 30–100 weight percent of the base formulation as described above and between about 0.1–70 weight percent dry ingredients before being solidified, the dry ingredients including a vegetable protein source and/or a vegetable oil and/or corn syrup refinery insolubles. Moreover, the finished product may contain a combination of vitamins and minerals. In one embodiment, the finished product would contain between about 80–99 weight percent dry solids.

Materials.

A substantially liquid agricultural byproduct is concentrated to form an amorphous solid cast, the substantially liquid agricultural byproduct being optionally combined with one or more sources of an exogenous carbohydrate, an exogenous fat, an exogenous nitrogen source, vitamins, minerals, recycled animal waste products, fibrous byproducts, drugs, general purpose additives, anticaking agents, supplemental nutrients (and/or dietary supplements), sequestrants, and/or stabilizers as are more fully explained hereinbelow.

I. Substantially Liquid Agricultural Byproduct.

The present amorphous solid cast feed product may be made from materials which include a substantially liquid agricultural byproduct. By way of illustration and not limitation, substantially liquid agricultural byproducts, which may be suitable for some embodiments of the present feed supplement, may include steepwater, condensed fermented corn extractives, stillage, condensed distillers solubles, whey, condensed whey solubles, lignin sulfonates, hemicellulose extract, citrus molasses, corn (starch) molasses, soap stocks (vegetable oil refinery lipids), lecithin, condensed extracted glutamic acid fermentation product, condensed fermentation solubles, or any mixture thereof.

A. Corn Steepwater and Condensed Fermented Corn Extractives.

In manufacturing the amorphous solid cast feed product, corn steepwater may be utilized as a substantially liquid agricultural byproduct. However, condensed fermented corn extractives may be preferred for some embodiments due to the higher solids content of this material. Condensed fermented corn extractives is the concentrated solubles (e.g., 40–60 weight percent solids) obtained from corn steepwater generated by the corn steeping process. The solids in condensed fermented corn extractives are rich in organic nitrogen (e.g., 30–46% protein on a dry matter basis). About one-half of the nitrogen of condensed fermented corn extractives may be present as free amino acids. The remainder of the nitrogen may exist as small peptides with very little intact protein. Condensed fermented corn extractives contains relatively high levels of several important vitamins, trace elements, and lactic acid. The lactic acid (10–30% dry basis) is synthesized by lactic-acid-producing organisms. Fermentation by these organisms takes place in the steeps and elsewhere in the process. The degree of fermentation depends on the conditions set and maintained by individual processors. In addition to defined ingredients, condensed fermented corn extractives also contains unidentified growth factors which are known to enhance livestock growth and development. An analysis of a typical condensed fermented corn extractives is disclosed in Table 1.

TABLE 1

Ingredients Present in Condensed Fermented Corn Extractives.

| | As Is | Dry Basis |
|---|---|---|
| Moisture (%) | 51.0 | 0.0 |
| Crude protein (%) | 15.9 | 32.5* |
| Crude fat (%) | 0.78 | 1.6 |
| Acid detergent fiber (%) | 0.3 | 0.6 |
| Total digestible nutrients (%) | 46.3 | 95.4 |
| Net energy maintenance (mcal/lb) | 0.49 | 1.00 |
| Net energy gain (mcal/lb) | 0.35 | 0.72 |
| Calcium (%) | 0.02 | 0.04 |
| Magnesium (%) | 0.39 | 0.80 |
| Phosphorus (%) | 0.78 | 1.60 |
| Potassium (%) | 1.27 | 2.60 |

TABLE 1-continued

Ingredients Present in Condensed Fermented Corn Extractives.

|  | As Is | Dry Basis |
|---|---|---|
| Sodium (%) | 0.6 | 1.20 |
| Sulfur (%) | 0.93 | 1.90 |
| Copper (ppm) | 4.0 | 8.0 |
| Iron (ppm) | 68 | 140 |
| Manganese (ppm) | 17 | 35 |
| Zinc (ppm) | 49 | 100 |
| Ash (%) | 5.12 | 10.45 |
| Amino Acids (%) | | |
| Aspartic acid | 1.47 | 3.00 |
| Threonine | 0.51 | 1.04 |
| Serine | 0.75 | 1.53 |
| Glutamic acid | 2.50 | 5.10 |
| Glycine | 0.72 | 1.47 |
| Alanine | 1.20 | 2.45 |
| Valine | 0.78 | 1.59 |
| Methionine | 0.31 | 0.63 |
| Isoleucine | 0.50 | 1.02 |
| Leucine | 1.29 | 2.63 |
| Tyrosine | 0.46 | 0.94 |
| Phenylalanine | 0.52 | 1.06 |
| Histidine | 0.44 | 0.89 |
| Lysine | 0.66 | 1.34 |
| Arginine | 0.77 | 1.57 |
| Proline | 1.42 | 2.90 |
| Hydroxyproline (<) | 0.01 | 0.01 |
| Cystine | 0.18 | 0.36 |
| Tryptophan | 0.05 | 0.10 |

*typically between about 30–46% protein.

B. Stillage and Condensed Distillers Solubles.

Stillage may be used as a substantially liquid agricultural product when manufacturing the present amorphous solid cast feed product. However, condensed distillers solubles may be preferable in many embodiments due to its higher solids content. Condensed distillers solubles is a byproduct obtained after the removal of ethanol by distillation from the yeast fermentation of a grain or grain mixture by condensing the thin stillage fraction to a solids content between about 25–60 weight percent. The predominating grain (e.g., corn, barley, rye, sorghum, wheat, cereals) is declared as the first word in the name (e.g., corn condensed distillers solubles). Characteristics of an acceptable embodiment of corn distillers solubles are disclosed in Table 2.

TABLE 2

Nutritional Characteristics of Condensed Corn Distillers Solubles.

| Protein (%) | 16.0* |
| Moisture (%) | 48.0** |
| Fat (%) | 2.0*** |
| Fiber (%) | 1.0 |
| pH | 4.3 |
| Ash (%) | 4.0 |
| Calcium (%) | 0.17 |
| Phosphorus (%) | 0.60 |
| Potassium (%) | 0.87 |
| Total carbohydrates | 20.0 |
| Calories/100 grams | 187.0 |
| TDN (%) | 30.0 |
| NFE (%) | 18.0 |
| Density (lb/gal) | 10.0 |
| Amino Acids (mg/g) | |
| Alanine | 7.9 |
| Arginine | 4.1 |
| Aspartic | 8.8 |
| Glutamic | 14.3 |
| Glycine | 5.5 |
| Histidine | 2.9 |
| Isoleucine | 4.3 |
| Leucine | 8.3 |
| Lysine | 6.0 |
| Methionine | 1.3 |
| Phenylalanine | 3.8 |
| Proline | 8.1 |
| Serine | 4.2 |
| Threonine | 4.4 |
| Tyrosine | 2.9 |
| Tryptophan | 0.6 |
| Valine | 5.7 |

*Typically between 16–20%.
**Typically between 40–75%.
***typically between 2.0–10.0%.

Blends of condensed fermented corn extractives, corn condensed distillers solubles, and corn syrup refiner insolubles may be suitable for some embodiments of the present product. One such blend is marketed by Minnesota Corn Processors, L.L.C., Marshall, Minn., under the mark Liquid Gold™. Liquid Gold™ also contains sulfuric acid and sodium metabisulfite. A characterization of Liquid Gold™ is depicted in Table 3.

TABLE 3

Nutritive Characterization of a Blend of Condensed Fermented Corn Extractives, Corn Condensed Distillers Solubles, and Corn Syrup Refiner Insolubles.

|  | As Is | Dry Basis |
|---|---|---|
| Moisture (%) | 49.0 | 0.00 |
| Crude protein (%) | 17.50 | 35.00 |
| Crude fat (%) | 0.70 | 1.40 |
| Acid detergent fiber (%) | 0.30 | 0.70 |
| Total digestible nutrients (%) | 46.30 | 95.40 |
| Net energy maintenance (mcal/lb) | 0.49 | 1.00 |
| Net energy gain (mcal/lb) | 0.35 | 0.72 |
| Calcium (%) | 0.04 | 0.08 |
| Magnesium (%) | 0.41 | 0.80 |
| Phosphorus (%) | 0.98 | 1.95 |
| Potassium (%) | 1.52 | 3.00 |
| Sodium (%) | 0.20 | 0.40 |
| Chloride (%) | 0.24 | 0.50 |
| Sulfur (%) | 0.95 | 1.90 |
| Copper (ppm) | 4 | 7 |
| Iron (ppm) | 73 | 145 |
| Manganese (ppm) | 23 | 45 |
| Zinc (ppm) | 76 | 150 |
| Amino Acids (%) | | |
| Aspartic acid | 1.47 | 3.00 |
| Threonine | 0.51 | 1.04 |
| Serine | 0.75 | 1.53 |
| Glutamic acid | 2.50 | 5.10 |
| Glycine | 0.72 | 1.47 |
| Alanine | 1.20 | 2.45 |
| Valine | 0.78 | 1.59 |
| Methionine | 0.31 | 0.63 |
| Isoleucine | 0.50 | 1.02 |
| Leucine | 1.29 | 2.63 |
| Tyrosine | 0.46 | 0.94 |
| Phenylalanine | 0.52 | 1.06 |
| Histidine | 0.44 | 0.89 |
| Lysine | 0.66 | 1.34 |
| Arginine | 0.77 | 1.57 |
| Proline | 1.45 | 1.29 |
| Cystine | 0.18 | 0.36 |
| Tryptophan | 0.05 | 0.10 |

C. Whey and Condensed Whey Solubles.

The present invention may use whey or condensed whey solubles in the basic formulation thereof. Whey typically has between about 5–7 weight percent solids. However, condensed whey solubles result when the water present in whey has been removed to where between about 20–60 weight percent of the whey is solids. Therefore, condensed whey solubles may be preferred in some embodiments because of higher solids content. Nutritional characteristics for two embodiments of condensed whey solubles are disclosed in Table 4. These whey solubles embodiments are available from First District Association, Litchfield, Minn. as DLP—Delactose Permeate 30% and 50%.

TABLE 4

Nutritional Characteristics of 30% and 50% Enriched Whey Solubles.

| Component | Percent |
|---|---|
| Protein | 8.50 (+/− 2.00) |
| Total Solids | 30.00 (+/− 2.00) |
|  | 50.00 (+/− 5.00) |
| Lactose | 71.50 (+/− 3.00) |
| Ash | 8.00 (+/− 3.00) |
| Others (Glucose, Lactic Acid, Citrates, Galactose) | 12.00 (+/− 3.00) |
| Minerals (Dry Matter Basis) |  |
| Calcium | 0.30 |
| Phosphorus | 0.79 |
| Sodium | 3.77 |
| Potassium | 3.91 |
| Magnesium | 0.16 |

D. Sulfonated Lignin Materials.

Sulfonated lignin materials are contemplated to encompass both sulfonated lignins and lignosulfonates, e.g., sodium, potassium, calcium, magnesium, lithium, and ammonium salts. Lignin is intended to refer to the substance typically recovered from alkali pulping black liquors, such as produced in kraft, soda, and other well-known alkali pulping operations. Sulfonated lignin is intended to encompass products obtained by the introduction of sulfonic acid groups onto the lignin molecule, as may be accomplished by the reaction of the lignin with sulfite or bisulfite compounds. Lignosulfonate is intended to encompass the reaction product of lignin obtained during sulfite pulping of wood, straw, corn stalks, bagasse, and the like, and is a principal constituent of the spent sulfite liquor, derived from that process. Lignosulfonates are salts of lignosulfonic acids, and are either by-products of the sulfite pulping process, or products of sulfonation of other lignin derivatives. Lignin derivatives include, but are not limited to, kraft lignin, organosolv lignin, chemically modified lignin derivatives, and mixtures thereof. Lignosulfonates are used as binders in the manufacture of animal feed pellets, as described in Canadian Patent 1,203,414, and U.S. Pat. Nos. 3,035,920, 5,281,434 and 6,113,974. One lignosulfonate suitable for use in the present product is calcium lignosulfonate, relevant properties of which are disclosed in Table 12. The present product is also contemplated to include ozonated lignosulfonates, made by processes such as disclosed in U.S. Pat. No. 4,181,652. If used, sulfonated lignin materials may be present in the product of this invention in amounts between about 0.25–6.0 weight percent, between about 0.25–3.0 weight percent, between about 0.45–0.9 weight percent, 0.25–2.0 weight percent, or about 1.25–2.5 weight percent. Sulfonated lignins may be used in the present product and amounts calculated on a dry weight basis as 1) a pelleting aid in an amount between about 0.1–4 weight percent of the finished pellets; 2) a binding aid (in the liquid form) in the flaking of feed grains in an amount between about 0.1–4 weight percent of the flaked grain; 3) a surfactant in molasses used in seeds, as liquid lignin sulfonate, in an amount between about 0.1–11 weight percent of molasses; and 4) a source of metabolizable energy (in liquid or dry forms) in an amount between about 0.1–4 weight percent of the finished feed.

TABLE 12

Typical Properties of Calcium Lignosulfonates

| Lignosulfonate | % | 80+ |
|---|---|---|
| Reducing sugars | % | 7 |
| Sulfur | % | 6.6 |
| Calcium | % | 5.0 |
| Sodium | % | 0.2 |
| Nitrogen | % | 0.1 |
| Ash | % | 20.0 |
| Moisture | % | 5.0 |
| pH (10% solution) |  | 4.5 |
| Viscosity cps (50% solution) |  | 900 |
| Specific gravity (lb./cfs) |  | 23 |

E. Hemicellulose Extract.

Hemicellulose extract (liquor) is a byproduct of the manufacture of pressed wood and is a concentrated soluble material obtained from the treatment of wood at elevated temperature and pressure without using acids, alkalis, or salts. Hemicellulose extract contains pentose and hexose sugars and has a total carbohydrate content of not less than about 55%.

F. Citrus Molasses.

Citrus molasses is a byproduct which is the partially dehydrated juices obtained from manufacturing dried citrus pulp and must contain not less than about 45% total sugars expressed as invert and a density determined by double dilution of not less than about 17.0 Brix.

G. Corn Molasses.

Corn (starch) molasses is a byproduct from manufacturing dextrose from starch derived from corn and/or grain sorghum in which the starch is hydrolyzed by use of enzymes and/or acid. Corn molasses usually contains not less than about 43% reducing sugars expressed as dextrose, not less than about 50% total sugars expressed as dextrose, and not less than about 73% total solids. In contrast to beet molasses which is moderately to highly alkaline, corn molasses is acidic, e.g., with a pH of between about 4.0 and 5.0.

H. Soap Stocks.

Soap stocks (vegetable oil refinery lipids) is a byproduct obtained from the alkaline refining of vegetable oils for edible uses and usually consists predominately of salts of fatty acids, glycerides, and phosphates. Soap stocks may contain water and usually not more than about 22% ash in a water-free basis.

I. Lecithin.

Lecithin (phosphatidylcholine) is a phospholipid and is the principal constituent of phosphatides derived from oil-bearing seeds such as soybeans and is a byproduct in extracting soybean oil. Soybean lecithin is a mixture of diglycerides linked to the choline ester of phosphoric acid. One exemplary soybean lecithin has palmitic, stearic, palmitoleic, oleic, linoleic, linolenic, and $C_{20-22}$ (including arachidonic) acids in respective proportions of about 11.7%, 4.0%, 8.6%, 9.8%, 55.0%, 4.0%, and 5.5%.

J. Condensed Extracted Glutamic Acid Fermentation Product.

Condensed extracted glutamic acid fermentation product is a concentrated mixture of the liquor remaining from extracting glutamic acid, combined with the cells of *Corynebacterium lilium* or *C. glutamicum* used to produce the glutamic acid.

K. Condensed Fermentation Solubles.

Condensed fermentation solubles is the product obtained from removing a considerable portion of the liquid byproduct resulting from the action of the ferment on the basic medium of grain molasses, whey, or other media.

II. Exogenous Carbohydrate.

The present amorphous solid cast feed product may include one or more exogenous carbohydrate sources. Exogenous carbohydrates are considered to be carbohydrates added to the present formulation exclusive of carbohydrates present in the substantially liquid agricultural byproduct. By way of illustration, and not limitation, exogenous carbohydrates suitable for some embodiments of the present amorphous solid cast feed product include starch, maltodextrins, syrup solids (e.g., corn syrup solids), low dextrose equivalent corn syrup, regular dextrose equivalent corn syrup, high dextrose equivalent corn syrup, dextrose, sucrose, fructose, beet molasses, dried beet molasses, dried beet pulp molasses, cane molasses, citrus molasses, condensed molasses yeast solubles, condensed molasses fermentation solubles, starch molasses, and molasses distillers condensed solubles. Table 5 discloses dextrose equivalent values for various carbohydrates and Table 6 discloses the compositions of various corn syrups.

TABLE 5

Dextrose Equivalent Values for Various Carbohydrates.

| Carbohydrate | Dextrose Equivalent |
|---|---|
| Starch | 0 |
| Maltodextrins | 5–20 |
| Corn syrup solids | 20–36 |
| Corn syrup | |
| Low DE | <30 |
| Regular | 42 |
| High | 92–100 |
| Dextrose | 100 |
| Sucrose | 0 |

TABLE 6

Compositions of Corn Syrups.

| Corn Syrup | Type Conversion | Dextrose Equivalent | Dextrose | Maltose | Maltotriose | Higher Polysaccharides |
|---|---|---|---|---|---|---|
| Very low | Acid-Enzyme | 26 | 5 | 14 | 14 | 67 |
| Low | Acid | 35 | 14 | 12 | 11 | 63 |
| Regular | Acid | 43 | 20 | 14 | 12 | 54 |
| Regular | Acid-Enzyme | 42 | 7 | 34 | 27 | 32 |
| Intermediate | Acid | 54 | 30 | 18 | 13 | 39 |
| High | Acid-Enzyme | 64 | 39 | 33 | 12 | 16 |
| Very high | Acid-Enzyme | 68 | 40 | 39 | 4 | 17 |

Exogenous carbohydrates are also contemplated to include isomerization products, such as fructose, xylulose, and the like. As previously stated, exogenous carbohydrate sources suitable for some embodiments of the present invention include corn syrups. Specific corn syrups suitable for some embodiments include acid-converted syrups with dextrose equivalents of 25, 36, 43, and 54, respectively and available as MinDex™ 1220, 1221, 1330, 1430, 1431, 1530, and 1531 from Minnesota Corn Processors, L.L.C. The syrups containing fructose are available as Mintose™ 3400, 3480, and 3500, also from Minnesota Corn Processors, L.L.C. Relevant characteristics of suitable corn syrups are disclosed in Table 7.

TABLE 7

High Fructose Corn Syrups.

| | Mintose 3400 ™ 42% | Mintose 3480 ™ 42% | Mintose 3500 ™ 55% |
|---|---|---|---|
| Total solids (%) | 71.0 | 80.0 | 77.0 |
| pH | 3.3 | 3.3 | 3.5 |
| Fructose (%) | 42.0 | 42.0 | 55.0 |

TABLE 7-continued

High Fructose Corn Syrups.

| Dextrose (%) | 52.0 | 52.0 | 40.0 |
|---|---|---|---|
| Maltose (%) | 3.0 | 3.0 | 3.0 |
| Higher saccharides (%) | 3.0 | 3.0 | 2.0 |
| Viscosity | | | |
| 80 degrees F. | 200 | 1190 | 760 |
| 100 degrees F. | 100 | 1100 | 360 |
| 120 degrees F. | 50 | 650 | 160 |

Unconverted Corn Syrups

| | MinDex 1220 ™ 25/42 | MinDex 1221 ™ 25/42 | MinDex 1330 ™ 36/43 | MinDex 1430 ™ 43/43 | MinDex 1431 ™ 43/43 | MinDex 1530 ™ 54/43 | MinDex 1531 ™ 54/43 |
|---|---|---|---|---|---|---|---|
| Dextrose equivalents (DE) | 25 | 25 | 36 | 43 | 43 | 55.5 | 52.5 |
| Baume (45C) | 42 | 42 | 43 | 43 | 43 | 43 | 43 |
| Total solids (%) | 79 | 79 | 80.4 | 80.7 | 80.7 | 82 | 81.3 |
| Moisture (%) | 22.5 | 22.5 | 20.0 | 19.3 | 19.3 | 18.9 | 18.9 |
| pH (50% solution) | 5.0 | 5.0 | 5.0 | 5.0 | 5.0 | 5.0 | 5.0 |
| Ash (%) | 0.30 | 0.30 | 0.30 | 0.30 | 0.30 | 0.30 | 0.30 |
| Sulfur dioxide (ppm) | 40 | 10 | 40 | 40 | 10 | 40 | 10 |
| Carbohydrate Profile (% DSB) | | | | | | | |
| DP1 | 8.0 | 8.0 | 14.0 | 20.0 | 20.0 | 30.0 | 30.0 |
| DP2 | 8.0 | 8.0 | 11.5 | 14.0 | 14.0 | 18.0 | 18.0 |
| DPS | 8.0 | 8.0 | 10.5 | 12.0 | 12.0 | 13.1 | 13.1 |
| DP4+ | 76.0 | 76.0 | 64.0 | 54.0 | 54.0 | 38.9 | 38.9 |
| Viscosity (Centipoise) | | | | | | | |
| 80 degrees F. | | | 125,000 | 80,000 | 80,000 | 35,000 | 35,000 |
| 100 degrees F. | | | 29,500 | 21,000 | 21,000 | 8,500 | 8,500 |
| 120 degrees F. | | | 10,000 | 5,600 | 5,600 | 2,500 | 2,500 |
| 140 degrees F. | | | 2,500 | 2,100 | 2,100 | 1,500 | 1,500 |
| 160 degrees F. | | | 1,000 | 900 | 900 | 630 | 630 |

III. Exogenous Nitrogen.

The present amorphous solid cast feed product may include a source of exogenous nitrogen. Exogenous nitrogen is considered to be nitrogenous materials exclusive of nitrogen present in the substantially liquid agricultural byproduct. The exogenous nitrogen source may be from proteinaceous plant and animal materials, from non-protein sources, or from animal waste products. Sources of plant protein suitable for some embodiments of the present amorphous solid cast feed product include dehydrated alfalfa, sun cured alfalfa, alfalfa stem meal, algae meal, dried beans, canola meal, coconut meal, corn germ meal, corn gluten feed, corn gluten meal, cottonseed flakes, cottonseed cake, cottonseed meal, whole cottonseed, crambe meal, guar meal, liquid and/or powdered egg, linseed meal, palm kernel oil meal, peanut meal, peas, perilla oil meal, rapeseed meal, safflower meal, sesame oil meal, soy protein concentrate, soybean feed, ground soybeans, soybean meal, kibbled soybean meal, heat processed soybeans, soy flour, soy grits, sunflower seed meal, dehulled sunflower meal, wheat germ meal, wheat middlings, wheat shorts, active dry yeast, brewers yeast, cultured yeast, dried yeast, primary dried yeast, and torula dried yeast. Some embodiments of the present amorphous solid cast feed product may also include protein from an animal source. Suitable sources of animal protein may be obtained from dried animal blood, blood meal, animal byproduct meal, condensed buttermilk, dry buttermilk, casein, dried hydrolyzed casein, cheese rind, crab meal, fish byproducts, fish liver and glandular meal, fish meal, fish protein concentrate, fish residue meal, condensed fish solubles, dried fish solubles, fleshings hydrolysate, hydrolyzed hair, hydrolyzed leather meal, hydrolyzed poultry byproduct aggregate, hydrolyzed poultry feathers, leather meal, leather hydrolysate, meat and bone meal, bone scraps, meat and bone meal tankage, meat meal, meat meal tankage, dried lactalbumin, dried whole milk, dried milk protein, poultry byproducts, poultry byproduct meal, poultry hatchery byproducts, shrimp meal, condensed skimmed milk, cultured skimmed milk, dried skimmed milk, dried cultured skimmed milk, and dried whey. Suitable sources of non-protein, or partially non-protein, nitrogen include urea, biuret, gelatinized starch-urea product, liquid starch-controlled urea product, ammonium chloride, diammonium phosphate, ammonium polyphosphate solution, ammoniated rice hulls, ammoniated cottonseed meal, ammonium sulfate, anhydrous ammonia, other neutralized ammonium salts, and monoammonium phosphate. Also suitable in some embodiments is salts of volatile fatty acids. Characteristics of corn gluten meal and corn gluten feed are depicted in Table 8.

TABLE 8

Nutritional Profiles of Corn Gluten Meal and Corn Gluten Feed.

| | Corn Gluten Meal | | Corn Gluten Feed | |
|---|---|---|---|---|
| | As Is | Dry Basis | As Is | Dry Basis |
| Moisture (%) | 10.0 | 0.0 | 58.5 | 0.0 |
| Crude protein (%) | 61.0 | 67.8 | 6.2 | 15.0 |
| Crude fat (%) | 1.4 | 1.6 | 1.2 | 3.0 |
| Acid detergent fiber (%) | 2.25 | 2.50 | 5.8 | 14.0 |
| Total digestible nutrients (%) | 86.0 | 95.6 | 37.4 | 90.0 |
| Net energy maintenance (Mcal/lb) | 0.89 | 0.99 | 0.40 | 0.96 |
| Net energy gain (Mcal/lb) | 0.60 | 0.67 | 0.27 | 0.65 |

TABLE 8-continued

Nutritional Profiles of Corn Gluten Meal and Corn Gluten Feed.

|  | Corn Gluten Meal | | Corn Gluten Feed | |
|---|---|---|---|---|
|  | As Is | Dry Basis | As Is | Dry Basis |
| Calcium (%) | 0.01 | 0.01 | 0.37 | 0.88 |
| Magnesium (%) | 0.01 | 0.01 | 0.0016 | 0.04 |
| Phosphorous (%) | 0.46 | 0.51 | 0.10 | 0.25 |
| Potassium (%) | 0.08 | 0.09 | 0.25 | 0.60 |
| Sodium (%) | 0.10 | 0.11 | 0.37 | 0.90 |
| Sulfur (%) | 0.86 | 0.95 | 0.10 | 0.25 |
| Copper (ppm) | 10.0 | 11.0 | 0.17 | 0.42 |
| Iron (ppm) | 85 | 95 | 3.70 | 9.0 |
| Manganese (ppm) | 2.70 | 3.00 | 37 | 90 |
| Zinc (ppm) | 18.0 | 20.0 | 21 | 50 |
| Xanthophyll (ppm) | 12 | 125 | | |
| Amino Acid Profile (%) | | | | |
| Aspartic acid | 3.98 | | | |
| Threonine | 1.56 | | | |
| Serine | 3.28 | | | |
| Glutamic acid | 13.52 | | | |
| Lysine | 1.51 | | | |
| Alanine | 5.04 | | | |
| Valine | 2.92 | | | |
| Methionine | 1.29 | | | |
| Isoleucine | 2.51 | | | |
| Leucine | 10.51 | | | |
| Tyrosine | 3.17 | | | |
| Phenylalanine | 4.00 | | | |
| Histidine | 1.34 | | | |
| Lysine | 1.00 | | | |
| Arginine | 1.91 | | | |
| Proline | 4.86 | | | |
| Hydroxyproline (<) | 0.01 | | | |
| Cystine | 1.11 | | | |
| Tryptophan | 0.19 | | | |

Another suitable exogenous protein source is a mixture of corn gluten meal with propionic acid, ammonium hydroxide, glycerin, monosodium glutamate, magnesium chloride, manganese chloride, and calcium chloride and is marketed by Minnesota Corn Processors, L.L.C. under the mark Gold Meal 60™. Yet another source of exogenous protein includes processed grain byproducts, corn condensed distillers solubles, corn syrup insolubles, and corn screenings and is marketed by Minnesota Corn Processors, L.L.C. under the Mark Gold Bran™. Nutritional profiles of Gold Meal 60™ and Gold Bran™ are disclosed in Table 9. Nutritional profiles of corn gluten feed, corn germ meal are shown in Table 10.

TABLE 9

Nutritional Profiles of Gold Meal 60 ™ and Gold Bran ™.

|  | Gold Meal 60 ™ | | Gold Bran ™ | |
|---|---|---|---|---|
|  | As Is | Dry Basis | As Is | Dry Basis |
| Moisture (%) | 10.00 | 0.00 | 58.50 | 0.00 |
| Crude protein (%) | 61.00 | 67.80 | 6.70 | 16.30 |
| Crude fat (%) | 1.60 | 1.80 | 0.60 | 1.50 |
| Acid detergent fiber (%) | 2.20 | 2.50 | 5.20 | 12.00 |
| Total digestible nutrients (%) | 86.00 | 95.60 | 37.40 | 90.00 |
| Net energy maintenance (Mcal/lb) | 0.89 | 0.99 | 0.40 | .96 |
| Net energy gain (Mcal/lb) | 0.60 | 0.67 | 0.27 | .65 |
| Net energy lactation (Mcal/lb) | | | 0.37 | 0.88 |
| Calcium (%) | 0.03 | 0.04 | 0.02 | .05 |
| Magnesium (%) | 0.02 | 0.02 | 0.13 | 0.30 |

TABLE 9-continued

Nutritional Profiles of Gold Meal 60 ™ and Gold Bran ™.

|  | Gold Meal 60 ™ | | Gold Bran ™ | |
|---|---|---|---|---|
|  | As Is | Dry Basis | As Is | Dry Basis |
| Phosphorous (%) | 0.60 | 0.65 | 0.24 | 0.58 |
| Potassium (%) | 0.30 | 0.33 | 0.42 | 1.00 |
| Sodium (%) | 0.02 | 0.02 | 0.08 | 0.20 |
| Chloride (%) | 0.09 | 0.10 | 0.07 | 0.18 |
| Sulfur (%) | 0.92 | 1.00 | 0.20 | 0.48 |
| Copper (ppm) | 12 | 14 | 2 | 5 |
| Iron (ppm) | 100 | 110 | 42 | 100 |
| Manganese (ppm) | 5 | 6 | 7 | 17 |
| Zinc (ppm) | 25 | 28 | 23 | 55 |
| Xanthophyll (ppm) | 220 | 244 | | |
| Amino Acid Profile (%) | | | | |
| Aspartic acid | 3.98 | | | |
| Threonine | 1.56 | | | |
| Serine | 3.28 | | | |
| Glutamic acid | 13.52 | | | |
| Glassine | 1.51 | | | |
| Alanine | 5.04 | | | |
| Valine | 2.92 | | | |
| Methionine | 1.29 | | | |
| Isoleucine | 2.51 | | | |
| Leucine | 10.51 | | | |
| Tyrosine | 3.17 | | | |
| Phenylalanine | 4.00 | | | |
| Histidine | 1.34 | | | |
| Lysine | 1.00 | | | |
| Arginine | 1.91 | | | |
| Proline | 4.86 | | | |
| Hydroxyproline (<) | 0.01 | | | |
| Cystine | 1.11 | | | |
| Tryptophan | 0.19 | | | |

TABLE 10

Composition of Corn Wet Milled Feeds.

|  | Unit | Corn Gluten Feed | Corn Gluten Meal | Corn Germ Meal | Condensed Fermented Corn Extractives |
|---|---|---|---|---|---|
| Dry Matter | % | 87–90 | 90 | 90 | 50 |
| Protein | % | 18–22 | 60 | 20.5 | 23 |
| Fat | % | 2–5 | 2.5 | 1 | 0 |
| Fiber | % | 6–10 | 2.5 | 12 | 0 |
| ADF | % | 13 | 5 | 14 | 0 |
| NDF | % | 35 | — | — | 0 |
| Ash | % | 6.5–7.5 | 1.8 | 3.8 | 8 |
| Ruminants | | | | | |
| TDN | % | 80 | 75 | 67 | 40 |
| Net Energy | | | | | |
| Gain | mcal/lb | 60 | 60 | 44 | — |
| Maintenance | mcal/lb | 0.80 | 0.85 | 0.70 | — |
| Lactation | mcal/lb | 0.77 | 0.80 | 0.69 | — |
| Metabolizable Energy | | | | | |
| Swine | kcal/lb | 1130 | 1600 | 1360 | 920 |
| Chicks | kcal/lb | 830 | 1760 | 770 | 725 |
| Hens | kcal/lb | 830 | 1760 | 770 | 725 |
| Turkeys | kcal/lb | 830 | 1760 | 770 | 725 |
| Calcium | % | 0.05 | 0.07 | 0.04 | 0.14 |
| Phosphorus | % | 1.00 | 0.48 | 0.30 | 1.80 |
| Potassium | % | 1.50 | 0.20 | 0.34 | 2.40 |
| Magnesium | % | 0.50 | 0.08 | 0.30 | 0.70 |
| Sulfur | % | 0.30 | 0.65 | 0.30 | 0.60 |
| Sodium | % | 0.15 | 0.06 | 0.07 | 0.11 |
| Iron | ppm | 363 | 282 | 337 | 110 |

TABLE 10-continued

Composition of Corn Wet Milled Feeds.

|  | Unit | Corn Gluten Feed | Corn Gluten Meal | Corn Germ Meal | Condensed Fermented Corn Extractives |
|---|---|---|---|---|---|
| Zinc | ppm | 250 | 31 | 92 | 70 |
| Manganese | ppm | 58 | 7 | 4 | 29 |
| Copper | ppm | 13 | 24 | 4 | 15 |
| Vitamins |  |  |  |  |  |
| Choline | mg/lb | 688 | 160 | 738 | 1550 |
| Niacin | mg/lb | 32 | 27 | 13 | 38 |
| Riboflavin | mg/lb | 0.9 | 0.9 | 1.8 | 2.7 |
| Thiamine | mg/lb | 0.9 | 0.1 | 2.0 | 1.3 |
| Biotin | mg/lb | 0.15 | 0.08 | 0.10 | 0.15 |
| Carotene | mg/lb | 3.00 | 7.27 | 0.90 | 0.00 |
| Amino Acids |  |  |  |  |  |
| Arginine | % | 0.78 | 2.08 | 1.30 | 1.00 |
| Histidine | % | 0.61 | 1.40 | 0.69 | 0.70 |
| Isoleucine | % | 0.88 | 2.54 | 0.69 | 0.70 |
| Lucine | % | 2.20 | 10.23 | 1.79 | 2.00 |
| Lysine | % | 0.64 | 1.01 | 0.90 | 0.80 |
| Methionine | % | 0.37 | 1.78 | 0.58 | 0.50 |
| Threonine | % | 0.78 | 2.20 | 1.09 | 0.90 |
| Tryptophan | % | 0.15 | 0.30 | 0.20 | 0.05 |

Yet another source of exogenous nitrogen includes processed grain byproducts. By way of illustration and not limitation, processed grain byproducts suitable for some embodiments of the present amorphous solid cast feed product include brewers dried grains, buckwheat middlings, distillers dried grains (e.g., barley, cereals, maize, rye, sorghum, wheat), distillers dried grains with solubles (e.g., barley, cereals, maize, rye, sorghum, wheat), distillers dried solubles (e.g., barley, cereals, maize, rye, sorghum, wheat), grain sorghum germ cake, grain sorghum germ meal, malt sprouts, wheat germ meal, defatted wheat germ meal, and wheat middlings.

IV. Exogenous Fat.

The present amorphous solid cast feed product may contain one or more sources of exogenous fat. Exogenous fat is intended to designate fat exclusive of the fat present in the substantially liquid agricultural byproduct. Exogenous fat is contemplated to include materials further described herein and which are either solid or liquid at room temperature. Exogenous fat may include glyceride esters of fatty acids with or without additional free fatty acids. Exogenous fat may be from vegetable or animal sources. Vegetable sources of exogenous fat suitable for some embodiments of the present amorphous solid cast feed product include, full fat corn germ, flaxseed, canola and/or rapeseed, sunflower seed and oil from hemp, barbassu, chia, cocoa butter, kukui, flax (linseed), pumpkin, soybean, walnut, wheat germ, evening primrose, safflower, sunflower, grape, corn, sesame, rice bran, cottonseed, perilla, poppy, rape (canola), peanut, almond, olive, avocado, coconut, palm, palm kernel, beech, brazil, pecan, pistachio, hickory, filbert, macadamia, cashew, and neem. Suitable sources of animal fats may include lard, tallow (beef and mutton), butterfat, Neat's foot, cod-liver, herring, menhaden, sardine, sperm (body and/or head), and whale. Also suitable for some embodiments are hydrolyzed fat or oil (e.g., hydrolyzed animal fats, hydrolyzed vegetable fat, hydrolyzed animal and vegetable fat), fatty acid esters (methyl esters of animal fatty acids, ethyl esters of vegetable oil fatty acids), vegetable oil refinery lipids, corn syrup refinery insolubles, calcium salts of long-chain fatty acids, hydrolyzed sucrose polyesters (e.g., hydrolyzed animal sucrose polyesters, hydrolyzed vegetable sucrose polyesters, hydrolyzed animal and vegetable sucrose polyesters).

V. Vitamins.

Exogenous or supplemental vitamins may also be included in the present product. By exogenous vitamins is meant to designate vitamins added additionally to those vitamins which might be present in the substantially liquid agricultural byproducts. These vitamins include, but are not limited to, vitamin A, vitamin D, vitamin E, vitamin K, vitamin C, thiamin, riboflavin, niacin, vitamin B-6, folic acid, and vitamin B-12.

VI. Minerals.

Exogenous or supplemental minerals may also be included in the present invention. Exogenous or supplemental minerals is contemplated to indicate minerals added to the present feed product which are additional to those present in the substantially liquid agricultural byproduct. Minerals suitable for inclusion include, but are not limited to, soluble salts of calcium, phosphorus, magnesium, iron, zinc, iodine, copper, cobalt, potassium, manganese, sodium, molybdenum, and selenium. Exemplary sources of soluble salts include ammonium sulfate, basic copper chloride, bone ash, bone charcoal, spent bone charcoal, cooked bone meal, steamed bone meal, bone phosphate, calcite, calcium carbonate, precipitated calcium carbonate, calcium chloride, calcium gluconate, calcium hydroxide, calcium iodate, calcium iodobehenate, calcium oxide, calcium periodate, calcium sulfate (e.g., anhydrous, dihydrate), precipitated chalk, chalk rock, chromium tripicolinate, ground clamshells, cobalt acetate, cobalt carbonate, cobalt chloride, cobalt choline citrate complex, cobalt glucoheptonate, cobalt gluconate, cobalt oxide, cobalt acetate monohydrate, cobalt sulfate, copper acetate monohydrate, copper carbonate, copper chloride (e.g., cuprous chloride, cupric chloride dihydrate), copper choline citrate complex, copper citrate, copper gluconate, copper hydroxide, copper orthophosphate, copper oxide (e.g., cuprous oxide, cupric oxide), copper sulfate (e.g., anhydrous cupric sulfate, cupric sulfate pentrahydrate), cuprous iodide, diiodosalicylic acid, ethylenediamine dihydriodide, ferric ammonium citrate, ferric chloride, ferric choline citrate complex, ferric formate, ferric phosphate, ferric pyrophosphate, ferric sulfate, ferrous carbonate, ferrous chloride, ferrous fumarate, ferrous gluconate, ferrous glycine complex, ferrous sulfate (e.g., ferrous sulfate monohydrate, ferrous sulfate heptahydrate), gypsiferrous shale, iron oxide (ferric oxide), reduced iron, ground limestone, magnesium or dolomitic limestone, magnesium carbonate (anhydrous magnesium carbonate, magnesium carbonate trihydrate, magnesium carbonate pentahydrate), magnesium chloride, magnesium hydroxide, magnesium phosphate, magnesium oxide, magnesium-mica, magnesium sulfate (anhydrous magnesium sulfate, magnesium sulfate monohydrate, magnesium sulfate heptahydrate), magnesium acetate, manganese carbonate, manganese chloride, soluble manganese citrate, manganese gluconate, manganese orthophosphate, dibasic manganese phosphate, manganese sulfate, manganous oxide, metal amino acid complex (e.g. amino acid complex with copper, zinc, magnesium, iron, cobalt, calcium, potassium, manganese), metal amino acid chelate, (e.g., calcium, cobalt, copper, iron, magnesium, manganese, zinc) metal polysaccharide complex (e.g., copper, iron, zinc, magnesium), metal propionate (e.g., zinc propionate), metal proteinate (e.g., copper, zinc, magnesium, iron, cobalt, manganese, calcium), ammonium polyphosphate solution, calcium phosphate, diammonium phosphate, dicalcium phosphate, disodium phosphate, monoammonium phosphate, monocalcium phosphate, monosodium phosphate, phosphoric acid, defluorinated phosphate, soft rock phosphate, ground rock phosphate, low fluorine rock phosphate, sodium hexametaphosphate, sodium tripolyphosphate, tribasic sodium phosphate, tricalcium phosphate potassium bicarbonate, potassium carbonate, potassium citrate, potassium chloride, potassium hydroxide, potassium iodate, potassium iodide, potassium sulfate, salt, iodized salt, shell flour, sodium acid pyrophosphate, sodium carbonate, sodium iodate, sodium iodide, sodium molybdate, sodium selenate, sodium selenite, sodium sesquicarbonate, elemental sulfur, thymol iodide, zinc acetate, zinc chloride, zinc carbonate, zinc chloride diamine complex, zinc oxide, zinc sulfate, calcium formate, magnesium gluconate, potassium gluconate, epson salts, manganese sulfate, red iron oxide, sodium chloride, sodium propionate, sodium bicarbonate, sodium sulfate, and zinc oxide.

VII. Recycled Animal Waste Products.

Recycled animal waste products may be ingredients in some embodiments of the present amorphous solid cast feed product. Exemplary recycled animal waste products may include dried poultry waste, dried poultry waste-NPN extracted, dried poultry litter, dried ruminant waste, dried swine waste, processed animal waste products, and processed animal waste derivative.

VIII. Fibrous Byproducts.

Fibrous byproducts may be included in the present amorphous solid cast feed product. Suitable miscellaneous products for some embodiments of the present amorphous solid cast feed product may include soybean hulls, cottonseed hulls, dried apple pomace, dried apple pectin pulp, almond hulls, almond hulls with almond shells, ground almond shells, ground whole aspen and/or parts, aspirated grain fractions, bagasse, dried bakery product, coastal Bermudagrass (e.g., dehydrated), buckwheat hulls, ground grass, ground straw, dried tomato pomace, beet fiber, psyllium CFS, and hydrolyzed roughage.

IX. Drugs.

Drugs may be an ingredient of the present amorphous solid cast feed product. The term "drug" is contemplated to designate materials, articles or supplements intended for use in the diagnosis, cure, mitigation, treatment, or prevention of disease in animals, e.g., a drug intended for use in, or on, animal feed which may be limited by an approved application filed pursuant to section 512 (b) of the Federal Food, Drug, and Cosmetic Act to use under the professional supervision of a licensed veterinarian. By way of illustration, and not limitation, drugs useful for certain embodiments of the present amorphous solid feed product may include Chlortetracycline, Chlortetracycline plus Sulfamethazine, Coumaphos, Decoquinate, Famphur, Fenbendazole, Laidlomycin propionate potassium, Lasalocid sodium, Levamisole hydrochloride, Melengestrol acetate, Monensin, Morantel tartrate, Neomycin sulfate, Neomycin/Oxytetracycline, Oxytetracycline, Penicillin, Pyrantel tartrate, Sulfaethoxypyridazine, Thiabendazole, Tylosin, and Virginiamycin.

X. General Purpose Additives.

General purpose additives may be an ingredient of the present amorphous solid cast feed product. A noninclusive listing of some general purpose additives, which might be suitable for some embodiments of the present feed product includes copper pyrophosphate, acetic acid, adipic acid, hydrochloric acid, lactic acid, malic acid, potassium acid tartrate, sodium acid pyrophosphate, succinic acid, sulfuric acid, tartaric acid, aluminum ammonium sulfate, aluminum potassium sulfate, aluminum sodium sulfate, ammonium bicarbonate, ammonium carbonate, ammonium hydroxide, butane, calcium citrate, calcium lactate, caramel, carbon dioxide, dextrans, glycerin, glyceryl monostearate, helium, hydrogen peroxide, methylcellulose, monoammonium glutamate, monopotassium glutamate, nitrogen, papain, propane, rennet, silica aerogel, sodium acetate, sodium caseinate, sodium citrate, sodium hydroxide, sodium pectinate, sodium aluminum phosphate, sodium potassium tartrate, triacetin, beeswax, bleached beeswax, and carnauba wax.

XI. Anticaking Agents.

Anticaking agents may be ingredients in some embodiments of the present amorphous solid cast feed product. Anticaking agents suitable for some embodiments of the present feed composition may include aluminum calcium silicate, magnesium silicate, hydrated sodium calcium aluminosilicate, tricalcium silicate, calcium sorbate, and gum guaiac.

XII. Nutrients And/Or Dietary Supplements.

Nutrients and/or dietary supplements may include previously described ingredients of the present amorphous solid cast feed product but may be considered as a category of ingredients under certain circumstances. By way of illustration, and not limitation, nutrients and/or dietary supplements suitable for some embodiments of the present feed composition may include aspartic acid, aminoacetic acid, linoleic acid, alanine, arginine, calcium citrate, calcium glycerophosphate, calcium pyrophosphate, choline bitartrate, cysteine, cystine, ferric sodium pyrophosphate, ferrous lactate, histidine, inositol, isoleucine, leucine, manganese glycerophosphate, manganese hypophosphite, mannitol, D-pantothinyl alcohol, phenylalanine, potassium glycerophosphate, proline, pyridozine space hydrochloride, riboflavin-5-phosphate, serine, sodium pantothenate, sodium phosphate, sorbitol, tyrosine, valine, vitamin A, and vitamin D2, zinc gluconate, and zinc stearate.

XIII. Sequestrants.

In some embodiments, sequestrants may be an ingredient in the present amorphous solid cast feed product. A nonlimiting recitation of sequestrants suitable for some embodiments of the present feed product may include citric acid, sodium acid phosphate, tartaric acid, calcium acetate, calcium citrate, calcium diacetate, calcium hexametaphosphate, calcium phytate, dipotassium phosphate, isopropyl citrate, monoisopropyl citrate, sodium citrate, sodium diacetate, sodium gluconate, sodium metaphosphate, sodium pyrophosphate, sodium tartrate, sodium potassium tartrate, sodium thiosulfate, and stearyl citrate.

XIV. Stabilizers.

Stabilizers may be ingredients in some embodiments of the present amorphous solid cast feed product. A nonlimiting listing of stabilizers satisfactory for some embodiments of the present feed product may include agar-auger, ammonium alginate, calcium alginate, gum arabic, gum ghatti, Guar gum, Locust bean gum, sterculia gum, gum tragacanth, potassium alginate, and sodium alginate.

A base mixture may include about 35–99.9 weight percent corn steepwater, corn distillers solubles, and/or condensed fermented corn extractives and about 0.1–50% hydrocarbon source. The base mixture ingredients may have a dry solids concentration between about 40–70%, and a pH of between about 3.5–7.5 or between about 3.5 and 6.5. The base mixture ingredients are heated to a temperature between about 100–240 degrees Fahrenheit until a dry solids concentration of between about 71–97% is attained. While reduction of moisture content may be accomplished in a single step, concentration may also be performed in a multiple step protocol. For example, initially the base mixture may be concentrated to between about 50–90% dry solids in a first step at a temperature between about 100–240 degrees Fahrenheit. In a subsequent step (or steps) the product may be concentrated to between about 71–97% dry solids at a temperature between about 100–240 degrees Fahrenheit. Concentration of solids may partially or totally take place under a partial vacuum, e.g., 5–20 inches Hg. In some embodiments 85–90 weight percent of the initial moisture will be removed. The remaining concentrated base mixture may have a moisture level of between about 3–15 weight percent.

WORKING EXAMPLES

EXAMPLE I

Condensed fermented corn extractives (CFCE) and dry ingredients (listed below) sufficient to make a product with desirable nutrition were pressed into molds and allowed to harden for a period of 72 hours. Corn gluten meal and dry corn germ meal were used as filling agents.

| Product | Proportion |
| --- | --- |
| CFCE (47.5% DS) | 40% |
| Corn germ meal | 35% |
| Corn gluten meal | 10% |
| Lime | 4% |
| Corn starch | 6% |
| Corn germ | 5% |

The block made by the foregoing protocol often had poor integrity (i.e., became too soft) during periods of high relative humidity.

EXAMPLE II

Chemical hardening agents were used in making embodiments of the present supplemental nutrient source. Calcium hydroxide was combined with phosphoric acid. Thereafter, adding magnesium oxide generated an exothermic chemical reaction. Heat from the exothermic reaction complexed free water. The following ingredients were used in making this feed product.

| Ingredient | Proportion |
| --- | --- |
| CFCE | 75.9% |
| Corn gluten meal | 12.6% |
| Lime | 5.1% |
| Magnesium oxide | 3.2% |
| Phosphoric acid | 3.2% |

A chemical matrix cemented the blended ingredients into a formed block. The hardness was affected by the moisture present in the original mix and time was allowed for "curing." Generally 24–48 hours were required for sufficient cooling and product hardening. Hardness of the block manufactured by this protocol was also dependent upon the temperature of the original mix and the time allowed for blending. While embodiments formed by the protocol of this example were acceptable for some uses, these embodiments were generally the least desirable from the standpoint of unpleasant odors and firmness.

EXAMPLE III

Embodiments of the present supplemental nutrient source were made using two general cooking protocols. One protocol included mixing all ingredients together and heating (baking) the total mixture. The second protocol included a two-step procedure. The first step was blending together liquid portions and evaporating the blended liquid portions under a vacuum (20–25 inches Hg). The vacuum provided for a lower evaporative temperature (160 degrees Fahrenheit-180 degrees Fahrenheit). A lower temperature, such as the foregoing temperature range, may be desirable for some embodiments of the present invention to prevent degrading (denaturing) the proteins and Maillard reactions in the liquid portion. An unmodified 43DE corn syrup was used to increase the sugar content of the mixture for crystallization and to improve the flowability of the liquid before cooling. The blended condensed fermented corn extractives, corn syrup refinery insolubles, and unmodified corn syrup were heated until it reached a temperature of 183 degrees Fahrenheit under a 25 Hg vacuum. At this point sufficient moisture had been evaporated from the materials being heated for solidification to occur when the materials were cooled to room temperature. Vegetable oil in the form of corn syrup refinery insolubles was used to increase the viscosity of the evaporated product. A five-quart pressure cooker was converted to a vacuum kettle. The dry portion was blended together, then heated to a point of almost total dryness. After evaporation was completed, the liquid and dry portions were blended together, poured into a container, and allowed to harden into blocks.

EXAMPLE IV

Condensed fermented corn extractives, corn refiner insolubles and 43DE unmodified corn syrup are blended together in a heating vat and heated until a temperature of 180 degrees Fahrenheit was attained under a partial vacuum of 25 inches Hg. At this point sufficient water had been evaporated from the materials for solidification to occur when the materials were cooled. The corn gluten meal, limestone, potassium chloride, dicalcium phosphate, and magnesium oxide were then added and the combined ingredients where stirred. When dispersion was substantially uniform, the condensed mixture was poured into a mold, where it hardened into an amorphous solid cast as it cooled.

| Ingredient | Proportion |
| --- | --- |
| Corn gluten meal | 18.40% |
| Limestone | 1.34% |
| Potassium chloride | 1.85% |
| Dicalcium phosphate | 0.73% |
| CFCE | 50.98% |
| Magnesium oxide | 0.24% |
| Refiners insolubles | 4.41% |
| Unmodified corn syrup | 22.00% |

Larger prototypes of a vacuum kettle may be used in making embodiments of the present product, using the protocol of Example IV. Samples of condensed fermented corn extractives and condensed fermented corn extractives with 63DE corn syrup were subjected to thin-film evaporator evaluations. These tests confirmed that process machinery would be able to evaporate the highly viscous product remaining after the evaporative cooling process. The blocks made by the protocol of Example IV did not become too soft during periods of high relative humidity and gave off no unpleasant odors.

EXAMPLE V

A first base mixture was formulated by combining corn syrup, heavy steepwater (CFCE), and soy oil in the amounts indicated hereinbelow. The ingredients were heated until they reached a temperature of 183 degrees Fahrenheit at a partial vacuum of 25 inches Hg.

| Ingredient | As Is | Dry Matter Basis |
|---|---|---|
| 1640 corn syrup | 21.41% | 31.17% |
| heavy steepwater | 75.50% | 63.47% |
| soy oil | 3.09% | 5.36% |

EXAMPLE VI

A second base mixture was formulated by combining corn syrup, heavy steepwater, and soy oil in the amounts indicated hereinbelow. The ingredients were heated until they reached a temperature of 183 degrees Fahrenheit at a partial vacuum of 25 inches Hg.

| Ingredient | As Is | Dry Matter Basis |
|---|---|---|
| 1640 corn syrup | 10.69% | 16.65% |
| heavy steepwater | 86.19% | 77.55% |
| soy oil | 3.13% | 5.80% |

EXAMPLE VII

The base mixture of Example V was combined with the following ingredients;

| Ingredient | Proportion (%) |
|---|---|
| base mixture | 60.00 |
| liquid vegetable fat | 3.82 |
| corn germ full fat | 25.00 |
| corn gluten meal* | 4.63 |
| selenium (0.06%) | 0.27 |
| calcium carbonate | 3.69 |
| copper sulfate | 0.04 |
| magnesium oxide | 0.25 |
| manganese oxide | 0.01 |
| sodium chloride | 1.71 |
| zinc oxide | 0.06 |
| vitamin premix | 0.53 |

*60% protein

The above-described ingredients were combined using the protocol of Example III to produce a block product with enhanced fat content and having the following analysis:

| | |
|---|---|
| Dry matter (%) | 94.51 |
| Protein (%) | 20.00 |
| NEg (mcal/cwt) | 61.19 |
| NEm (mcal/cwt) | 93.38 |
| ADF (%) | 3.16 |
| NDF (%) | 1.89 |
| Vitamin A (IU/lb) | 25,000.00 |
| Vitamin D (IU/lb) | 2500.00 |
| Vitamin E (IU/lb) | 20.00 |
| Calcium (%) | 1.50 |
| Phosphorus (%) | 1.06 |
| Sodium chloride (%) | 2.00 |
| Potassium (%) | 1.45 |
| Sulfur (%) | 0.37 |
| Magnesium (%) | 0.60 |
| Zinc (ppm) | 500.00 |
| Iron (ppm) | 100.44 |
| Copper (ppm) | 100.00 |
| Manganese (ppm) | 100.00 |
| Cobalt (ppm) | 10.00 |
| Iodine (ppm) | 5.50 |
| Selenium (ppm) | 1.65 |
| Ca:P Ratio | 1.42 |
| Fat (%) | 20.88 |
| Fiber (%) | 4.38 |

EXAMPLE VIII

The base mixture of Example VI was combined with the following ingredients;

| | |
|---|---|
| Base mixture | 60.00 |
| Corn gluten meal (60%) | 25.56 |
| Selenium (0.06%) | 0.64 |
| Calcium carbonate | 2.64 |
| Copper sulfate | 0.12 |
| Dicalcium phosphate | 2.26 |
| Magnesium oxide | 1.60 |
| Manganese oxide | 0.15 |
| Phosphate* | 2.70 |
| Potassium chloride | 2.08 |
| Zinc oxide | 0.14 |
| Vitamin premix | 2.11 |

*deflourinated

The above-described ingredients were combined using the foregoing protocol to produce a block product with enhanced protein content and having the following analysis:

| | |
|---|---|
| Dry matter (%) | 93.67 |
| Protein (%) | 30.20 |
| NEg (mcal/cwt) | 50.79 |
| NEm (mcal/cwt) | 75.83 |
| ADF (%) | 1.50 |
| NDF (%) | 3.59 |
| Vitamin A (IU/lb) | 100000.00 |
| Vitamin D (IU/lb) | 10000.00 |
| Vitamin E (IU/lb) | 80.00 |
| Calcium (%) | 2.50 |
| Phosphorus (%) | 2.00 |
| Sodium chloride (%) | 1.45 |
| Potassium (%) | 2.50 |
| Sulfur (%) | 0.50 |
| Magnesium (%) | 1.37 |
| Zinc (ppm) | 1200.00 |
| Iron (ppm) | 650.00 |
| Copper (ppm) | 320.00 |
| Manganese (ppm) | 1200.00 |
| Cobalt (ppm) | 3.30 |
| Iodine (ppm) | 15.00 |
| Selenium (ppm) | 4.00 |
| Ca:P Ratio | 1.25 |
| Fat (%) | 4.25 |
| Fiber (%) | 1.39 |

Because numerous modifications of this invention may be made without departing from the spirit thereof, the scope of the invention is not to be limited to the embodiments illustrated and described. Rather, the scope of the invention is to be determined by the appended claims and their equivalents.

What is claimed is:

1. A method of making an amorphous solid cast feed product, comprising:
condensing a substantially liquid agricultural byproduct; and
solidifying the condensed substantially liquid agricultural byproduct in a mold, thereby forming the amorphous solid cast feed product with a solids content between about 71 and 97 weight percent.

2. A method of claim 1, in which a 10 weight percent aqueous solution of the amorphous solid cast feed product has a pH less than about 7.5.

3. The method of claim 1, in which the condensed substantially liquid agricultural byproduct is selected from steepwater, condensed fermented corn extractives, stillage, condensed distillers solubles, whey, condensed whey solubles, sulfonated lignin materials, hemicellulose extracts, citrus molasses, corn molasses, and any mixtures thereof.

4. The method of claim 3, in which the substantially liquid agricultural byproduct is condensed and solidified such that the pH of the 10 weight percent aqueous solution is less than about 6.5.

5. The method of claim 3, in which the substantially liquid agricultural byproduct is condensed and solidified such that the pH of the 10 weight percent aqueous solution is between about 3.5 and 7.5.

6. The method of claim 3, in which the substantially liquid agricultural byproduct is condensed and solidified such that the pH of the 10 weight percent aqueous solution is between about 3.5 and 6.5.

7. The method of claim 1, in which the condensed substantially liquid agricultural byproduct is selected from condensed fermented corn extractives, condensed distillers solubles, condensed whey solubles, and any mixture thereof.

8. The method of claim 1, in which the condensed substantially liquid agricultural byproduct is selected from condensed fermented corn extractives, condensed distillers solubles, and any mixture thereof.

9. The method of claim 1, in which the substantially liquid agricultural byproduct is condensed such that the solids content is between about 80 and 95 weight percent.

10. The method of claim 1, in which the substantially liquid agricultural byproduct is condensed such that the solids content is between about 85 and 95 weight percent.

11. The method of claim 1, in which the substantially liquid agricultural byproduct is condensed by heat.

12. The method of claim 1, in which the substantially liquid agricultural byproduct is condensed by being heated at a temperature between about 100 and 240 degrees Fahrenheit.

13. The method of claim 1, in which the substantially liquid agricultural byproduct is condensed by being heated in a partial vacuum.

14. The method of claim 1, in which the substantially liquid agricultural byproduct is condensed by being heated at a temperature between about 100 and 240 degrees Fahrenheit in a partial vacuum.

15. The method of claim 1, in which the substantially liquid agricultural byproduct is condensed by being heated at a temperature between about 160 and 180 degrees Fahrenheit in a partial vacuum between about 20 and 25 inches Hg.

16. The method of claim 1, further comprising blending an exogenous carbohydrate or an exogenous fat with the substantially liquid agricultural product before the solidifying step.

17. The method of claim 1, further comprising blending the substantially liquid agricultural byproduct with an exogenous carbohydrate and an exogenous fat.

18. The method of claim 17, further comprising blending an exogenous nitrogen source to said blend of substantially liquid agricultural byproduct, exogenous carbohydrate, and exogenous fat.

19. The method of claim 17, further comprising blending vitamins and minerals to said blend of the substantially liquid agricultural byproduct, exogenous carbohydrate, and exogenous fat.

20. The method of claim 1, further comprising blending a sulfonated lignin material to the substantially liquid agricultural byproduct.

21. An amorphous solid cast feed product, comprising a condensed and mold-solidified substantially liquid agricultural byproduct, in which a 10 weight percent aqueous solution of the amorphous solid cast feed product has a pH less than about 7.5.

22. The amorphous solid cast feed product of claim 21, the condensed substantially liquid agricultural byproduct having a solids content of between about 71 and 97 weight percent.

23. The amorphous solid cast feed product of claim 21, further comprising an exogenous fat or an exogenous carbohydrate solidified with the condensed substantially liquid agricultural byproduct.

24. The amorphous solid cast feed product of claim 21, further comprising an exogenous fat and an exogenous carbohydrate solidified with the condensed substantially liquid agricultural byproduct.

25. The amorphous solid cast feed product of claim 24, in which the condensed substantially liquid agricultural byproduct is selected from steepwater, condensed fermented corn extractives, stillage, condensed distillers solubles, whey, condensed whey solubles, and any mixture thereof.

26. The amorphous solid cast feed product of claim 24, in which the condensed substantially liquid agricultural byproduct is selected from condensed fermented corn extractives, condensed distillers solubles, and any mixture thereof.

27. The amorphous solid cast feed product of claim 26, further comprising an exogenous protein source.

28. The amorphous solid cast feed product of claim 26, further comprising vitamins and minerals.

29. The amorphous solid cast feed product of claim 26, further comprising a sulfonated lignin material.

30. An amorphous solid cast feed product formed by a process comprising:
condensing a substantially liquid agricultural byproduct; and
solidifying the condensed substantially liquid agricultural byproduct in a mold, in which a 10 weight percent aqueous solution of the amorphous solid cast feed product has a pH less than about 7.5.

31. The amorphous solid cast feed product formed by the process of claim 30, in which the substantially liquid agricultural byproduct is condensed and solidified such that the amorphous solid cast feed product has a solids content between about 71 and 97 weight percent.

32. The amorphous solid cast feed product formed by the process of claim 31, in which the condensed and solidified substantially liquid agricultural byproduct is selected from steepwater, condensed fermented corn extractives, stillage, condensed distillers solubles, whey, condensed whey solubles, and any mixture thereof.

33. The amorphous solid cast feed product formed by the process of claim 31, in which the condensed and solidified substantially liquid agricultural byproduct is selected from condensed fermented corn extractives, condensed distillers solubles, and any mixture thereof.

34. The amorphous solid cast feed product formed by the process of claim 33, said process further comprising blending an exogenous fat or an exogenous carbohydrate with the substantially liquid agricultural byproduct.

35. The amorphous solid cast feed product formed by the process of claim 33, said process further comprising blending an exogenous fat and an exogenous carbohydrate with the substantially liquid agricultural byproduct.

36. The amorphous solid cast feed product formed by the process of claim 35, said process further comprising blending an exogenous nitrogen source, a vitamin, a mineral, a sulfonated lignin material a recycled animal waste product, or any combination thereof with said exogenous fat, exogenous carbohydrate, and substantially liquid agricultural byproduct.

37. The amorphous solid cast feed product formed by the process of claim 30, in which the condensing step comprises heating the substantially liquid agricultural byproduct.

38. The amorphous solid cast feed product formed by the process of claim 37, in which the substantially liquid agricultural byproduct is condensed by being heated at a temperature between about 100 and 240 degrees Fahrenheit.

39. The amorphous solid cast feed product formed by the process of claim 30, in which the condensing step comprises heating the substantially liquid agricultural byproduct in a partial vacuum.

40. The amorphous solid cast feed product formed by the process of claim 39, in which the substantially liquid agricultural byproduct is heated at a temperature between about 160 and 180 degrees Fahrenheit.

41. The amorphous solid cast feed product formed by the process of claim 40, in which the partial vacuum is between about 20 and 25 inches Hg.

* * * * *